United States Patent
Brooks et al.

(10) Patent No.: US 7,994,910 B2
(45) Date of Patent: Aug. 9, 2011

(54) DIRECTING A MOVEMENT OF VISITORS IN AN EVENT VENUE FOR MAXIMIZING REVENUE

(75) Inventors: Patrick Joseph Brooks, Toronto (CA); Rhonda L. Childress, Austin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 12/331,893

(22) Filed: Dec. 10, 2008

(65) Prior Publication Data

US 2010/0141480 A1 Jun. 10, 2010

(51) Int. Cl.
*G08B 1/08* (2006.01)
(52) U.S. Cl. ............. 340/539.13; 340/539.1; 340/539.2; 340/573.1; 340/573.4; 340/686.1
(58) Field of Classification Search ............. 340/539.13, 340/539.1, 539.2, 573.1, 573.4, 686.1
See application file for complete search history.

(56) References Cited

U.S. PATENT DOCUMENTS

| | | |
|---|---|---|
| 5,502,806 A | 3/1996 | Mahoney et al. |
| 6,020,883 A * | 2/2000 | Herz et al. .............. 715/721 |
| 7,047,205 B2 | 5/2006 | Hale et al. |
| 2006/0084448 A1 | 4/2006 | Halcrow et al. |
| 2006/0100985 A1 | 5/2006 | Mark et al. |
| 2007/0109134 A1 | 5/2007 | Dugan et al. |
| 2007/0276537 A1 * | 11/2007 | Walker et al. ................. 700/238 |
| 2010/0254527 A1 * | 10/2010 | Addair ............... 379/265.12 |
| 2010/0274597 A1 * | 10/2010 | Dill ................................ 705/7 |

FOREIGN PATENT DOCUMENTS

WO 0146916 A2 6/2001

* cited by examiner

*Primary Examiner* — Daryl Pope
(74) *Attorney, Agent, or Firm* — Yee & Associates, P.C.; Libby Z. Toub

(57) ABSTRACT

The illustrative embodiments described herein provide a computer implemented method, apparatus, and computer program product for directing a movement of visitors in an event venue. In one embodiment, the process generates a visitor profile for each visitor at an event venue. The visitor profile may include, without limitation, a unique identifier and location data. The location data is collected from a set of sensors distributed throughout the event venue. The process then monitors a capacity of visitors at each venue destination using the location data. In response to determining that the capacity of visitors at a first venue destination exceeds a threshold capacity for the first venue destination, the process selects a second venue destination for accommodating visitors of the first venue destination. The process selects the second venue destination based on selection criteria. The process then dispatches a venue employee to the first venue destination to direct one or more visitors at the first venue destination to the second venue destination.

13 Claims, 3 Drawing Sheets

DIRECTING A MOVEMENT OF VISITORS IN AN EVENT VENUE FOR MAXIMIZING REVENUE

BACKGROUND OF THE INVENTION

1. Field of the Invention

This disclosure is related generally to a data processing system and in particular to a method and apparatus for maximizing revenue in an event venue. More particularly, the present invention is directed to a computer implemented method, apparatus, and computer usable program code for directing a movement of visitors in an event venue to maximize revenue.

2. Description of the Related Art

Event venues are locations in which events or attractions are hosted. The events or attractions may include, for example, sporting events, art shows, magic shows, conventions, concerts, roller coasters or amusement park rides, and other types of attractions. Thus, the event venues may include concert halls, stadiums, parks, amusement parks, buildings, convention centers, or other locations in which events and attractions may be hosted. Event venues often include venue destinations. Venue destinations are locations within an event venue in which visitors are expected or encouraged to visit. A venue destination may include, for example, amusement park rides, concession stands, game kiosks, arcades, souvenir shops, ticket counters, restrooms, restaurants, or the events or attractions listed above. In many instances, venue destinations are sources of revenue for event venue operators. For example, amusement parks often prohibit visitors from bringing outside food or drink with the expectation that visitors will spend money purchasing consumables at one of the many restaurants or concession stands located within the amusement park.

BRIEF SUMMARY OF THE INVENTION

According to one embodiment, the process generates a visitor profile for each visitor at an event venue. The visitor profile may include, without limitation, a unique identifier and location data. The location data is collected from a set of sensors distributed throughout the event venue. The process then monitors a capacity of visitors at each venue destination using the location data. In response to determining that the capacity of visitors at a first venue destination exceeds a threshold capacity for the first venue destination, the process selects a second venue destination for accommodating visitors of the first venue destination. The process selects the second venue destination based on selection criteria. The process then dispatches a venue employee to the first venue destination to direct one or more visitors at the first venue destination to the second venue destination.

DETAILED DESCRIPTION OF THE INVENTION

Figure 1:
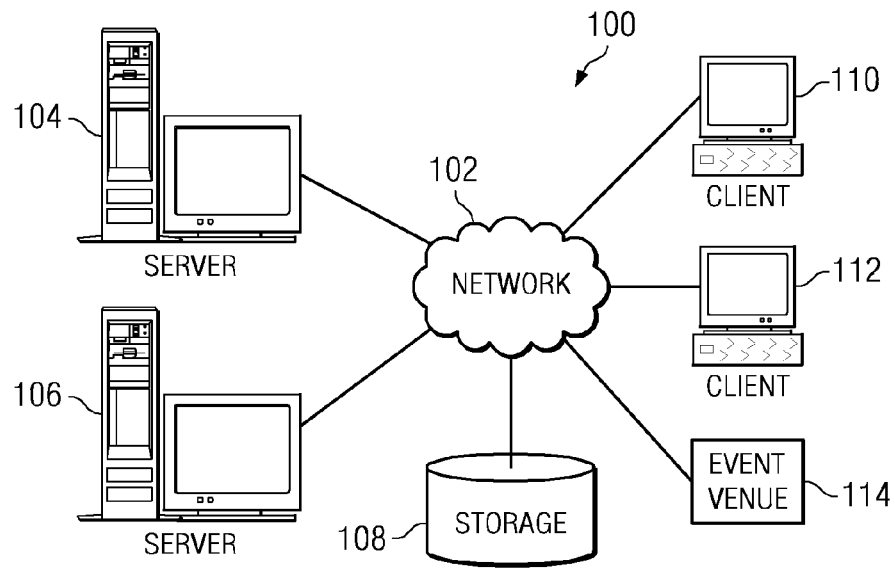
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110 and 112 connect to network 102. Clients 110 and 112 may be, for example, personal computers or network computers. In the depicted example, server 104 provides data, such as boot files, operating system images, and applications to clients 110 and 112. Clients 110 and 112 are clients to server 104 in this example. Network data processing system 100 may include additional servers, clients, and other devices not shown.

Networked data processing system 100 may also include event venue 114. Event venue 114 is a location in which events or attractions are hosted. The events or attractions may include, for example, sporting events, art shows, conventions, concerts, amusement park rides, and other types of attractions. As such, the event venues may include concert halls, stadiums, parks, amusement parks, buildings, or other locations in which events and attractions may be hosted. Event venues often include venue destinations. Venue destinations are locations within event venue 114 in which visitors are expected and/or encouraged to visit. A venue destination may be, for example, amusement park rides, concession stands, game kiosks, arcades, souvenir shops, ticket counters, restrooms, or restaurants.

In an illustrative embodiment, a client, such as client 110, may host park controller software for monitoring visitors in event venue 114. The park controller software may then generate instructions for directing park visitors from one venue destination to another venue destination within event venue 114 based upon a visitor threshold capacity. For example, the park controller may direct a family from an overcrowded restaurant to a nearby restaurant offering similar food items.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
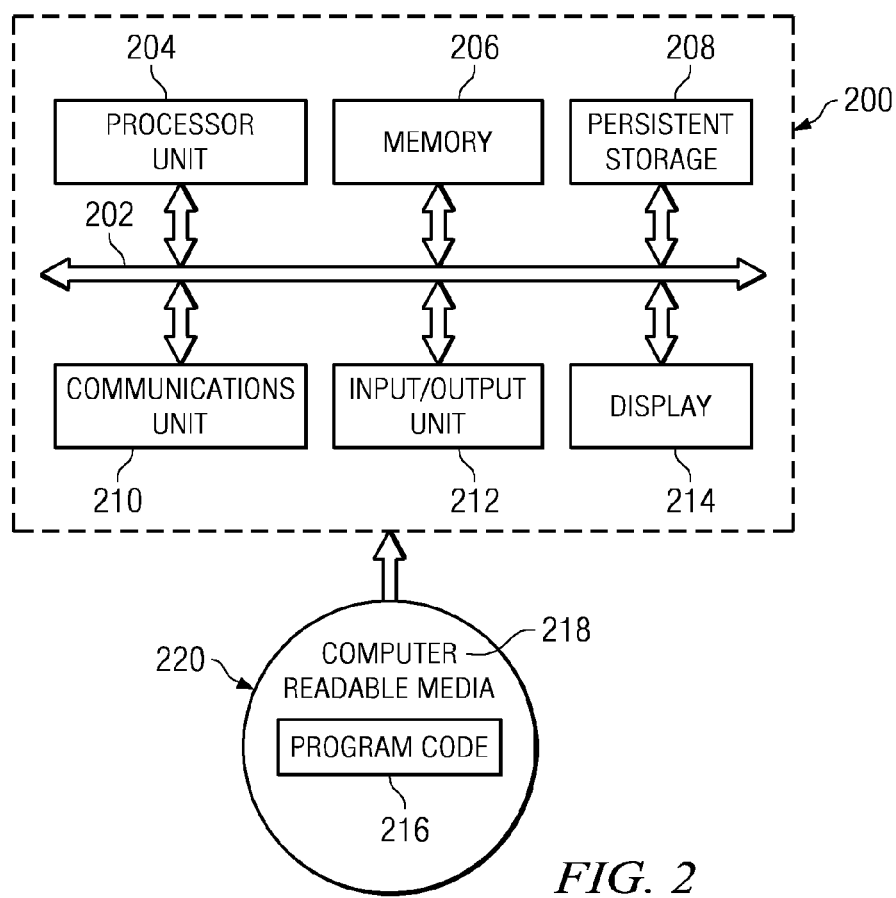
FIG. 2 is a block diagram of a data processing system in which illustrative embodiments may be implemented.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

At an event venue, visitors move from one location to another in a relatively random fashion despite the fact that venue destinations may be strategically placed throughout an event venue to maximize revenue. Even venue destinations that are not sources of revenue may be strategically placed throughout the event venue with the intent of enticing users to spend money to generate revenue. For example, restrooms may be placed in an event venue in proximity to other revenue generating venue destinations, such as arcades, souvenir shops, or restaurants.

Some venue destinations, such as rides, events, retail facilities, or restaurants may have longer lines, a greater density of visitors, and operate at peak revenue generating capacity. However, visitors of the event venue may be less inclined to stay and spend money if the visitor's experience is less than ideal. For example, the longer visitors wait in line, whether at a revenue-generating venue destination or not, the less time the visitor has to spend money at venue destinations that generate a revenue stream. In addition, if crowds at a certain venue destinations would require the visitor to wait for hours to access the venue destination, then the visitor may be more inclined to leave earlier. Less time spent in an event venue equates to less opportunity for the visitor to spend money at venue destinations that generate revenue The illustrative embodiments described herein provide a computer implemented method, apparatus, and computer program product for directing a movement of visitors in an event venue for increasing a revenue stream. In one embodiment, the process generates a visitor profile for each visitor at an event venue. The visitor profile may include, without limitation, a unique identifier and location data. The location data is collected from a set of sensors distributed throughout the event venue. The process then monitors a capacity of visitors at each venue destination using the location data. The process may monitor the capacity of visitors at each venue destination by tracking at least one of an identification tag and a personal communications device of each visitor at the event venue. As used herein the phrase "at least one of" when used with a list of items means that different combinations one or more of the items may be used and only one of each item in the list may be needed. For example, "at least one of item A, item B, and item C" may include, for example, without limitation, item A or item A and item B. This example also may include item A, item B, and item C or item B and item C. In other words, the process may monitor a visitor by either tracking a visitor identification tag, a personal communications device, or both.

In response to determining that the capacity of visitors at a first venue destination exceeds a threshold capacity for the first venue destination, the process selects a second venue destination for accommodating visitors of the first venue destination. The process selects the second venue destination based on selection criteria. The process then dispatches a venue employee to the first venue destination to direct one or more visitors at the first venue destination to the second venue destination.

Figure 3:
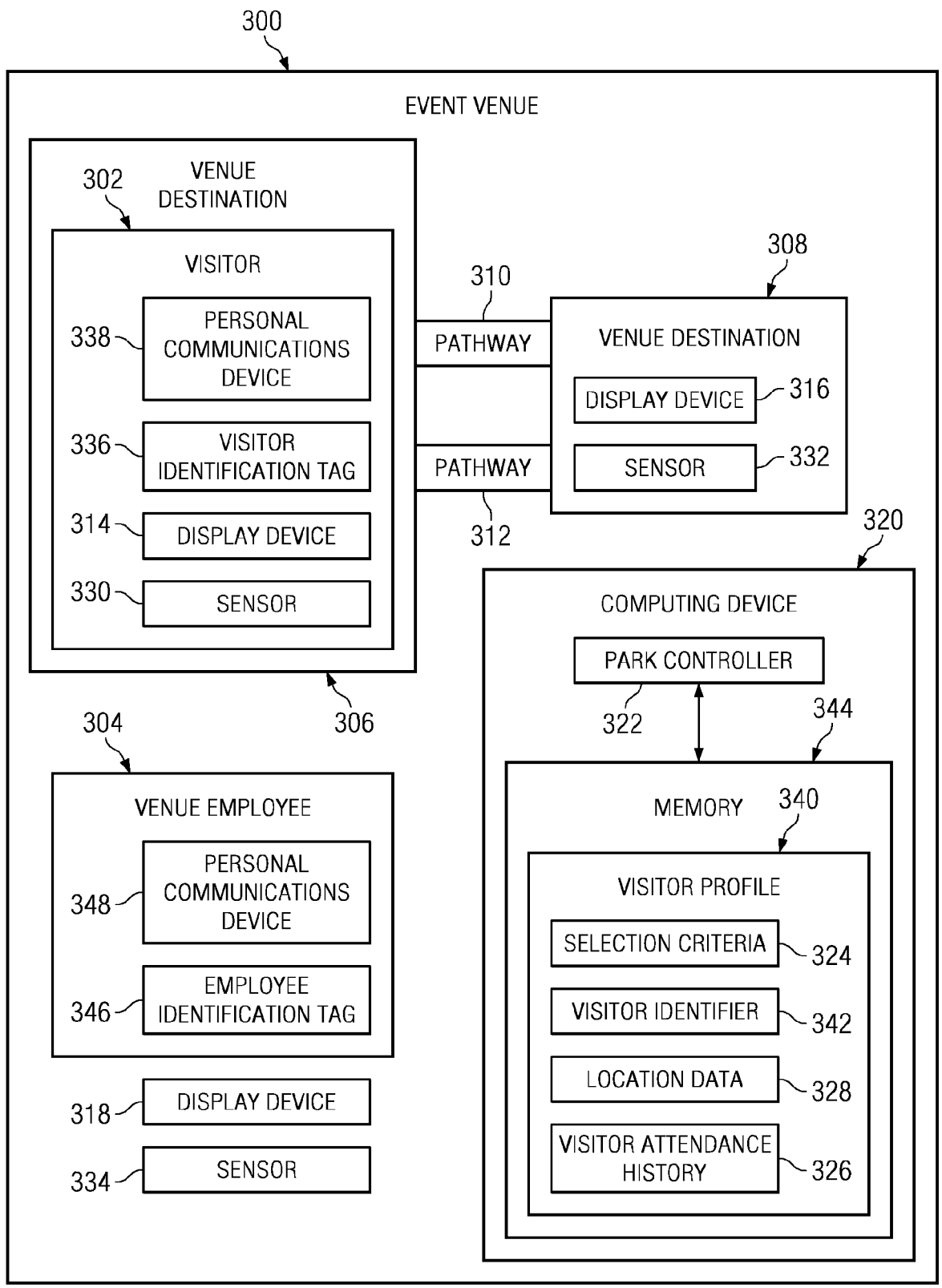
FIG. 3 is a block diagram of a system for directing movement of visitors in an event venue in accordance with an illustrative embodiment.

FIG. 3 is a block diagram of an event venue in accordance with an illustrative embodiment. The event venue is an event venue such as event venue 114 in FIG. 1.

Event venue 300 is built for attracting visitors, such as visitor 302. Visitor 302 is a set of one or more people who visit event venue 300. Visitor 302 may be one or more people. For example, visitor 302 may be a single person or family of four. In addition, event venue may be staffed by venue employee 304. Venue employee 304 is one or more people who work at event venue 300. Venue employee 304 may be a ride operator, maintenance worker, security guard, greeter, customer service representative, or other employee working at event venue 300.

Event venue 300 includes a set of venue destinations. The set of venue destinations in FIG. 3 includes venue destinations 306 and 308. Venue destinations 306 and 308 are locations and/or attractions within event venue 300 that visitor 302 is expected and/or encouraged to visit. Venue destinations 306 and 308 may be, for example, rides, concession stands, game kiosks, arcades, souvenir shops, ticket counters, restrooms, information booths, or restaurants. Although event venue 300 includes only two venue destinations, more venue destinations may be present.

Venue destinations 306 and 308 may be connected by a set of one or more pathways. In this illustrative embodiment in FIG. 3, venue destinations 306 and 308 are connected by pathways 310 and 312. Pathways 310 and 312 may be streets, gondolas, elevators, escalators, sidewalks, or other means of getting from one location to another.

Event venue 300 also includes a set of display devices. The set of display devices in event venue 300 includes display devices 314, 316, and 318. Display devices 314, 316, and 318 are hardware components for presenting information to persons located within event venue 300. Display device 314 may be a video monitor, television, speaker, or other form of device for presenting audio and/or visual information. Display devices 314, 316, and 318 may be placed throughout event venue 300. For example, display devices 314 and 316 are placed in venue destination 306 and venue destination 308, respectively. Display device 318 is placed in an area outside of a venue destination. Display device 318 may be placed in an employee break room or an operations center for reference by venue employee 304.

Event venue 300 includes computing device 320. Computing device 320 is a computing device such as server 104 and client 110 in FIG. 1. Computing device 320 hosts park controller 322. Park controller 322 a software component configured to direct the movement of visitors from one venue destination in event venue 300 to another venue destination. Park controller 322 directs visitors from a first venue destination to a second based upon a threshold capacity of visitors assigned to each venue destination at event venue 300. For example, if the number of visitors at venue destination 306 exceeds the visitor threshold, then park controller 322 selects a second venue destination within event venue 300 for accommodating visitors at venue destination 306. In this illustrative example, park controller 322 selects the second venue destination, venue destination 308, based upon selection criteria 324.

Selection criteria 324 are rules for selecting the second venue destination. Selection criteria 324 may specify a threshold capacity of visitors for each venue destination within event venue 300. Once the threshold capacity is reached, then park controller 322 may initiate the process for directing visitors from venue destination 306 to a second venue destination, venue destination 308. The threshold capacity of visitors may include, for example, a number of visitors at each venue destination or a wait time for visitors at each venue destination. For instance, if venue destination 306 is a restaurant, then selection criteria may specify that a threshold capacity of visitors is the number of visitors that may be seated in the restaurant according to applicable fire codes. In addition, the threshold capacity may be an amount of time that a visitor stands in line to order food.

Selection criteria 324 may also include a rule that the second venue destination has a correlation or similarity with the first venue destination. The similarity may be any type of similarity between the two venue destinations. For example, if venue destination 306 is a concession stand serving hamburgers, then venue destination 308 may be selected because venue destination 308 also servers hamburgers. In this manner, park controller 322 may direct a visitor from venue destination 306 to venue destination 308 based upon a similarity between venue destinations.

In addition, selection criteria 324 may instruct park controller 322 to select the second venue destination based upon visitor attendance history 326. Visitor attendance history 326 is data describing a visitors past attendance at various venue destinations within event venue 300. For example, visitor 302 may be located at venue destination 306, a rollercoaster. If park controller 322 determines that the threshold capacity at venue destination 306 has been exceeded, park controller 322 may direct visitor 302 to venue destination 308, another rollercoaster that visitor 302 has visited many times in the past.

A capacity of visitors at each venue destination within event venue 300 may be determined from location data 328. Location data 328 is data describing the location of visitors at event venue 300. Location data 328 may be collected by a set of sensors distributed throughout event venue 300. The set of sensors in FIG. 3 include sensors 330, 332, and 334. Sensors 330, 332, and 334 are sensors for tracking visitors within event venue 300. Sensors 330 and 332 are located within venue destinations 306 and 308, respectively. Sensor 334 is located in an area of event venue 300 remote from a venue destination. For example, sensor 334 may be placed in an area for tracking the movement of a visitor traveling from one venue destination to another, such as in pathway 310.

In one embodiment, sensors 330, 332, and 334 may monitor the location of visitors at event venue 300 by locating visitor identification tag 336. Visitor identification tag 336 is an identification tag assigned to visitor 302 for tracking and identifying visitor 302. Identification tag 336 may be, for example, a radio frequency identification tag embedded in a wristband or ticket stub. In this example, sensors 330, 332, and 334 may be radio frequency identification tag readers. In other embodiments, identification tag 336 may be any type of existing or later developed identification tag.

Location data 328 may also be collected from a data collected from a personal communications device in the possession of visitor 302 if the personal communications device is outfitted with a locator system. For example, personal communications device 338 may be a smart phone implementing a global positioning system. Location data 328 may be collected using the coordinates derived from the global positioning system of personal communications device 338.

Location data 328 may be stored in visitor profile 30. Visitor profile 340 is a profile created for visitors of event venue 300. Visitor profile 340 is differentiated from other visitor profiles based upon visitor identifier 342. Visitor identifier 342 is a unique identifier assigned to each visitor of event venue 300. Visitor identifier 342 may be a social security number, cell phone number, or other unique identifier. Visitor profile 340 may also include visitor attendance history 326.

Visitor profile 340 is stored in memory 344. Memory 344 is a hardware component for storing data. Examples of memory 344 may include, without limitation, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device.

Park controller 322 may direct visitors from one venue destination to another by providing instructions on the set of display devices located throughout event venue 300. For example, if park controller 322 determines that the number of visitors at venue destination 306 has exceeded a threshold capacity, then park controller 322 may send instructions to visitors at venue destination 306 to move to venue destination 308. The instructions may be presented to the visitors at venue destination 306 on display device 314.

In another embodiment, park controller 322 directs visitors from one venue destination to another by providing instructions to visitors on their personal communications devices. Thus, if visitor 302 is at venue destination 306, or moving towards venue destination 306, then park controller 322 may send movement instructions to visitor 302 on personal communications device 338. The instructions may direct visitor 302 to move toward venue destination 308 because of overcrowding at venue destination 306.

In yet another embodiment, park controller 322 may direct visitors from one venue destination to another by dispatching venue employees to facilitate or direct the movement of visitors. For example, park controller 322 may dispatch venue employee 304 to direct users from venue destination 306 to venue destination 308. Venue employee 304 may direct users from one venue destination to another by approaching visitors and verbally instructing the visitors to move to another venue destination. Alternatively, venue employee 304 may provide shuttle services to help move visitors from venue destination 306 to venue destination 308. Venue employee 304 may also open or close one or more pathways leading to or from a venue destination to control the movement of visitors. For example, venue employee 304 may cordon off pathway 310 leading to venue destination 306 to prevent more visitors from visiting venue destination 306 if the number of visitors has exceeded a threshold capacity.

Park controller 322 may identify venue employee 304 for dispatch based upon a proximity to a particular venue destination. A location of venue employee 304 may be monitored throughout event venue 300 in the same manner as that of visitor 302. In particular, a location of venue employee 304 may be monitored by tracking employee identification tag 346. Employee identification tag 346 is an identification tag such as visitor identification tag 336. In addition, the location of venue employee 304 may be monitored by tracking personal communications device 348 in the possession of venue employee 304 provided that personal communications device 348 is outfitted with a form of tracking technology, such as a global positioning system.

Although the illustrative embodiments provided above are directed to maximizing a revenue stream at event venue 300, other embodiments may include moving visitors from one venue destination to another in order to achieve other predefined goals. One such goal may be, for example, to minimize crowding. Crowding may be minimized by setting a threshold number of visitors that may be located at any given venue destination. Park controller 322 may monitor the number of visitors at each venue destination of event venue 300 by tracking the visitor's identification tag or personal communications device. Once the number of visitors exceeds the threshold, park controller 322 may then direct visitors to another venue destination within event venue 300.

Another predefined goal may be limiting a visitor's wait time at a venue destination. For example, if visitor 302 is a located at venue destination 306, a restroom having a line of visitors with a wait time in excess of a threshold wait time, then park controller 322 may identify another restroom, venue destination 308, having a shorter wait time. Park controller 322 may then send to visitor 302 directions for locating venue destination 308. The directions may be sent to personal communications device 338. Alternatively, park controller 322 may dispatch venue employee 304 to direct visitor 302 to venue destination 308. Park controller 322 may dispatch venue employee 304 by sending instructions to personal communications device 348.

Figure 4:
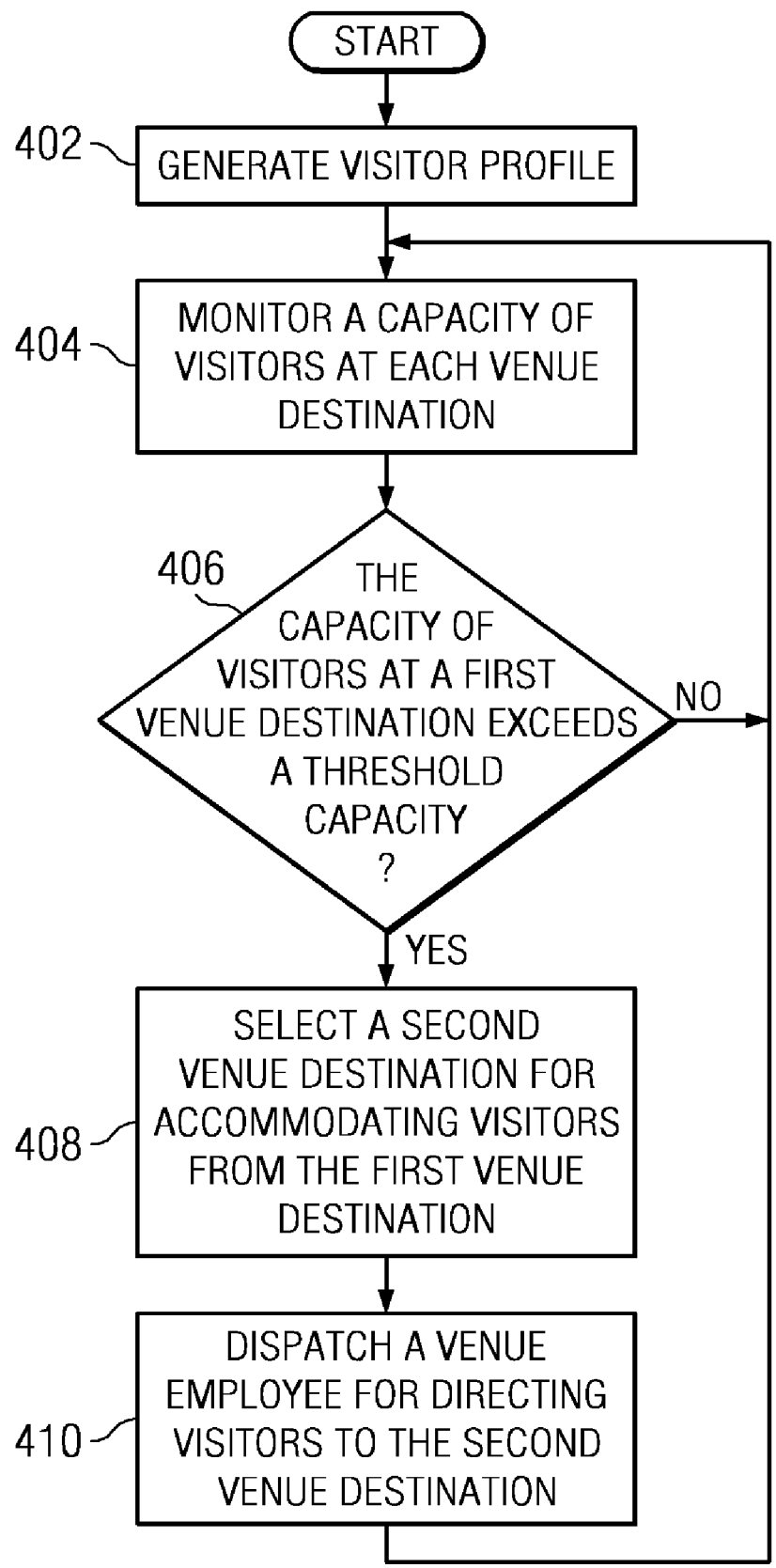
FIG. 4 is a flowchart of a process for directing movement of visitors in an event venue in accordance with an illustrative embodiment.

FIG. 4 is a flowchart of a process for directing the movement of visitors in an event venue in accordance with an illustrative embodiment. The process in FIG. 4 may be implemented in a software component, such as park controller 322 in FIG. 3.

The process begins by generating a visitor profile (step 402). The visitor profile is a visitor profile such as visitor profile 340 in FIG. 3. The visitor profile may be generated when the visitor enters the park. Alternatively, visitor profiles may be generated remotely, such as via the Internet.

The process then monitors a capacity of visitors at each venue destination in an event venue (step 404). The process may monitor a capacity of visitors at each venue destination by tracking an identification tag assigned to each visitor. The identification tag may be an identification tag such as identification tag 336 in FIG. 3. In an alternate embodiment, visitors may be monitored by tracking a visitor's personal communications device that is enabled with some form of tracking function, such as a global positioning system.

The process then makes the determination as to whether the capacity of visitors at a first venue destination exceeds a threshold capacity (step 406). If the process makes the determination that the capacity of visitors at the first venue destination does not exceed a threshold capacity, then the process returns to step 404. However, if the process makes the determination that the capacity of visitors at the first venue destination does exceed a threshold capacity, then the process selects a second venue destination for accommodating visitors from the first venue destination (step 408). The process then dispatches a venue employee for directing visitors to the second venue destination (step 410). The process then returns to step 404 to continue monitoring the capacity of visitors at each venue destination within the event venue.

The illustrative embodiments recognize that current methodologies for directing the movement of visitors throughout an event venue may be inadequate. As such, some venue destinations of event venues may be overcrowded whereas other venue destinations may be under-utilized. Overcrowded venue destinations may result in lower revenue streams because visitors may be disinclined to wait in line to make purchases. Similarly, venue destinations not operating at peak capacity lose revenue that could have otherwise been realized if more visitors were present. In addition, the longer a visitor waits in line, the less opportunity the visitor has to spend money at revenue-generating venue destinations.

The dispatching of venue employees to direct and facilitate the movement of visitors produces more tangible results than simply posting information on displays throughout an event venue. For example, visitors may overlook a display instructing the visitors to move to a less crowded venue destination. However, dispatching a venue employee for directing the movement of the visitors produces immediate and results. Furthermore, the sending of instructions to a personal communications device provides individualized instruction that may be tailored to each visitor. Visitors will be more responsive to such instruction, thereby increasing the likelihood that under-utilized venue destinations will receive additional patronage.

The illustrative embodiments described herein provide a computer implemented method, apparatus, and computer program product for directing a movement of visitors in an event venue. In one embodiment, the process generates a visitor profile for each visitor at an event venue. The visitor profile may include, without limitation, a unique identifier and location data. The location data is collected from a set of sensors distributed throughout the event venue. The process then monitors a capacity of visitors at each venue destination using the location data. In response to determining that the capacity of visitors at a first venue destination exceeds a threshold capacity for the first venue destination, the process selects a second venue destination for accommodating visitors of the first venue destination. The process selects the second venue destination based on selection criteria. The process then dispatches a venue employee to the first venue destination to direct one or more visitors at the first venue destination to the second venue destination.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for directing movement of visitors, the computer implemented method comprising:
    generating a visitor profile for each visitor at an event venue, wherein the visitor profile comprises a unique identifier and location data, and wherein the location data is collected from a set of sensors distributed throughout the event venue;
    monitoring a capacity of visitors at each venue destination within the event venue;
    responsive to determining that the capacity of visitors at a first venue destination exceeds a threshold capacity for the first venue destination, selecting a second venue destination for accommodating visitors of the first venue destination, wherein the second venue destination is selected based on selection criteria; and
    dispatching a venue employee to the first venue destination to direct at least one visitor at the first venue destination to the second venue destination.

2. The computer implemented method of claim 1, wherein selecting the second venue destination further comprises:
    selecting the second venue destination based on an attendance history.

3. The computer implemented method of claim 1, further comprising:

transmitting, to a personal communications device, instructions to locate the second venue destination.

4. The computer implemented method of claim 1, wherein monitoring the capacity of visitors at each venue destination comprises:
   tracking at least one of an identification tag and a personal communications device of each visitor at the event venue.

5. The computer implemented method of claim 1, wherein the capacity of visitors comprises at least one of a number of visitors and a wait time.

6. The computer implemented method of claim 1, wherein the dispatching step further comprises:
   monitoring a location of each venue employee within the event venue; and
   dispatching the venue employee closest to the first venue destination.

7. A computer program product for directing movement of visitors, the computer program product comprising:
   a computer usable storage device;
   first program instructions for generating a visitor profile for each visitor at an event venue, wherein the visitor profile comprises a unique identifier and location data, and wherein the location data is collected from a set of sensors distributed throughout the event venue;
   second program instructions for monitoring a capacity of visitors at each venue destination within the event venue;
   third program instructions for selecting a second venue destination for accommodating visitors of a first venue destination in response to determining that the capacity of visitors at the first venue destination exceeds a threshold capacity for the first venue destination, wherein the second venue destination is selected based on based on selection criteria;
   fourth program instructions for dispatching a venue employee to the first venue destination to direct at least one visitor at the first venue destination to the second venue destination; and
   wherein the first program instructions, the second program instructions, the third program instructions, and the fourth program instructions are stored on the computer usable storage device.

8. The computer program product of claim 7, wherein the third program instructions for selecting the second venue destination further comprises:
   program instructions for selecting the second venue destination based on an attendance history.

9. The computer program product of claim 7, further comprising:
   fifth program instructions for transmitting, to a personal communications device, instructions to locate the second venue destination, wherein the fifth program instructions are stored on the computer usable storage device.

10. The computer program product of claim 7, wherein the second program instructions for monitoring the capacity of visitors at each venue destination comprises:
    program instructions for tracking at least one of an identification tag and a personal communications device of each visitor at the event venue.

11. The computer program product of claim 7, wherein the capacity of visitors comprises at least one of a number of visitors and a wait time.

12. The computer program product of claim 7, wherein the fourth program instructions comprise:
    program instructions monitoring a location of each venue employee within the event venue; and
    program instructions for dispatching the venue employee closest to the first venue destination.

13. An apparatus for directing movement of visitors, the apparatus comprising:
    a bus system;
    a memory connected to the bus system, wherein the memory includes computer usable program code; and
    a processing unit connected to the bus system, wherein the processing unit executes the computer usable program code to generate a visitor profile for each visitor at an event venue, wherein the visitor profile comprises a unique identifier and location data, and wherein the location data is collected from a set of sensors distributed throughout the event venue; monitor a capacity of visitors at each venue destination within the event venue; select a second venue destination for accommodating visitors of a first venue destination in response to determining that the capacity of visitors at the first venue destination exceeds a threshold capacity for the first venue destination, wherein the second venue destination is selected based on based on selection criteria; and dispatch a venue employee to the first venue destination to direct at least one visitor at the first venue destination to the second venue destination.

* * * * *